(12) United States Patent
Mallik et al.

(10) Patent No.: US 10,664,357 B1
(45) Date of Patent: May 26, 2020

(54) SINGLE AGENT BACKUP FOR CLOUD NETWORKS

(71) Applicant: EMC IP Holding Company LLC, Hopkinton, MA (US)

(72) Inventors: Shubhashish Mallik, Bangalore (IN); Tushar Dethe, Bangalore (IN); Anupam Chakraborty, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 650 days.

(21) Appl. No.: 15/384,998

(22) Filed: Dec. 20, 2016

(51) Int. Cl.
*G06F 16/00* (2019.01)
*G06F 11/14* (2006.01)
*G06F 9/455* (2018.01)

(52) U.S. Cl.
CPC ...... *G06F 11/1464* (2013.01); *G06F 9/45558* (2013.01); *G06F 2009/45579* (2013.01); *G06F 2009/45583* (2013.01); *G06F 2009/45591* (2013.01); *G06F 2009/45595* (2013.01); *G06F 2201/84* (2013.01)

(58) Field of Classification Search
CPC .................................................. G06F 11/1464
USPC ......................................................... 707/649
See application file for complete search history.

(56) References Cited

U.S. PATENT DOCUMENTS

| 8,166,265 B1* | 4/2012 | Feathergill | G06F 11/1466 711/161 |
| 8,516,210 B2* | 8/2013 | Buragohain | G06F 11/1456 711/162 |
| 9,098,333 B1* | 8/2015 | Obrecht | G06F 9/50 |

* cited by examiner

*Primary Examiner* — Chelcie L Daye
(74) *Attorney, Agent, or Firm* — Staniford Tomita LLP (57) ABSTRACT

Embodiments are directed to a method of backing up virtual machines coupled to a backup server in a large-scale data storage system, by installing a single instance of a backup management program on the backup server; pushing, by the backup management program, a backup agent to each virtual machine; detecting, through the backup agent, all applications running on a respective virtual machine; taking a snapshot of each application after freezing the applications and prior to thawing the applications, by the backup agent; and saving the snapshot of the each applications on a storage medium. The pushing step comprises creating a shared folder and exposing the shared folder to all the virtual machines for remote invocation by the backup program.

17 Claims, 7 Drawing Sheets

SINGLE AGENT BACKUP FOR CLOUD NETWORKS

TECHNICAL FIELD

Embodiments are generally directed to network-based data backup methods, and more specifically to single agent backup systems for cloud networks.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. The advent of virtualization technology has led to the increased use of virtual machines as data storage targets. Virtual machine (VM) disaster recovery systems using hypervisor platforms, such as a vSphere or ESXi platform from VMware or Hyper-V from Microsoft, among others, have been developed to provide recovery from multiple disaster scenarios including total site loss. The immense amount of data involved in large-scale (e.g., municipal, enterprise, etc.) level backup applications and the number of different potential problems that exist means that backup performance and reliable operation is a critical concern for system administrators.

To achieve server virtualization in cloud computing environments, users are moving towards using hypervisors that can be used to deploy multiple virtual machines (VMs). This helps to keep costs low, facilitates easier management of machines, and allows for expansion of infrastructure on demand. Virtualized storage systems, such as Hyper-V servers are being rapidly and increasingly deployed in customer's environments. In order to achieve high availability Hyper-V virtual machines are often configured in a clustered environment with the data stored on CSV (cluster shared volume) based systems. The size of these deployments is growing by the day, thus introducing significant challenges in protecting cloud infrastructures as networks scale up in size.

At present, backup systems and methods are not necessarily optimized for cloud networks using large numbers of virtual machines. For example, in a clustered environment, it is necessary to undertake several complicated process steps. First, in an example Hyper-V network, the administrator must install a backup application on a Hyper-V cluster to protect the Hyper-V environment. Next, application agent or agents are installed on each VM in the Hyper-V cluster to protect application/applications. This step is required to take an application consistent backup. Although Microsoft Windows provide the VSS infrastructure to take application consistent backups, this works well in case of standalone application backups, but if the application is a clustered/distributed one, there needs to be synchronization between the participating nodes for performing the backup operation. In this case backup agents need to be present on the participating nodes to synchronize and perform the backup operation. Backup agents are also needed for non-Microsoft or open source applications (for example, MySQL). At the backup server, the following configuration is required: (1) create Hyper-V cluster clients (One client for each participating node in backup) to protect the Hyper-V environment, and (2) create VMs clients to protect applications.

In present systems the backup workflow is similarly complicated. It requires a backup agent to be installed on each VM, and for each new VM created, the backup administrator needs to install a backup agent inside. When the backup operation starts on the Hyper-V server, the backup process on the Hyper-V server contacts the backup agent installed inside the VM to take the applications to a consistent state. The backup process then copies the data to the backup media.

Present backup methods are especially problematic for purposes of scaling up VM networks. If a system has multiple VMs on a Hyper-V cluster with multiple applications installed then it is necessary to install backup agents on multiple VMs. During installation the system administrator needs to know which application agent needs to be installed on a VM. If a new application is installed on the same VM later then a new application agent needs to be installed. Multiple configurations are required on the backup server for all the VMs to enable backup of participating VMs. Multiple backups need to be started and monitored in the backup application, and the administrator needs to analyze logs at multiple locations in case of error. This is obviously a complicated solution that is tedious and introduces a great deal of configuration overhead and possibility for error. Scalability is also an issue as the backup and maintenance of N number of clients becomes very difficult in case of a scaled-out cloud environment.

What is needed is a backup system that implements a more cloud-friendly paradigm to fully enable cloud capabilities. That would make the backup process agile, flexible and help keep up the demands made by cloud infrastructure while keeping the data safe as per the customer recovery point objective (RPO) and recovery time objective (RTO).

What is further needed is a backup technology that needs no management intervention from backup administrator as new Virtual Machines are created in the cloud, and that supports latest hypervisor technologies available for customers, so that they can leverage the features that new technologies provide while keeping their data safe in cloud environments.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
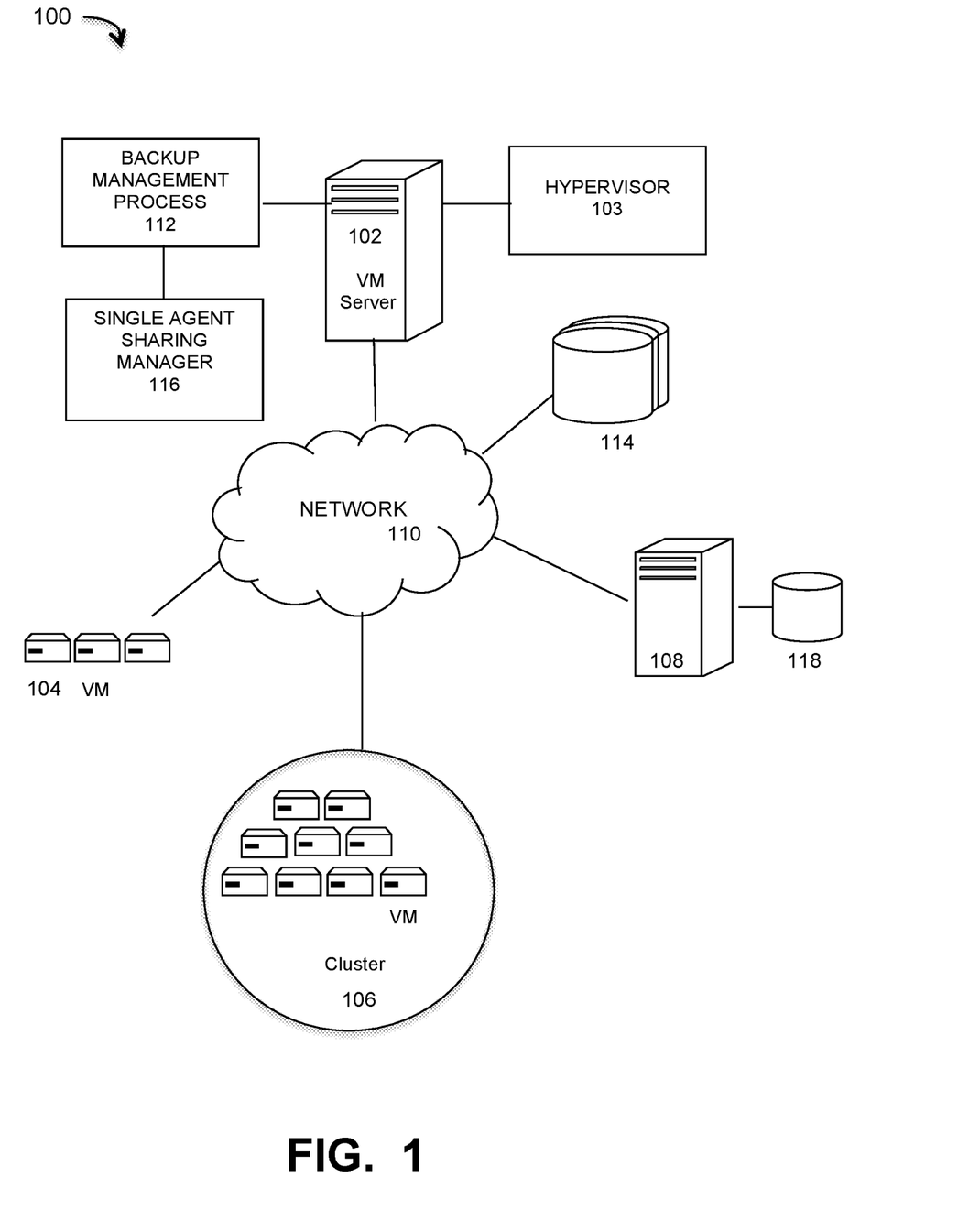
FIG. 1 is a diagram of a large-scale network implementing a single agent sharing manager that provides efficient backups of clustered VMs, under some embodiments.

FIG. 1 illustrates a computer network system 100 that implements one or more embodiments of single backup agent configuration manager for backing up virtual machines and VM clusters in a large-scale computer network. In system 100, a number of VMs or groups of VMs 104 are provided to serve as backup targets. Target VMs may also be organized into one or more clusters or virtual centers 106 representing a physical or virtual network of many virtual machines (VMs), such as on the order of hundreds to thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) that uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 1, network system 100 includes a VM server 102 that executes hypervisor or virtual machine monitor (VMM) 103 that creates and runs virtual machines, such as VMs 104 or clustered VMs 106. In this embodiment, server 102 is a host machine and each VM is a guest machine.

Server 102 may also serve as a backup server that executes a backup management process 112, which automates the backup of data using the target VM devices. In an embodiment, the process 112 uses certain known full and incremental (or differencing) backup techniques along with a snapshot backup process that is used to store an image or images of the system(s) to be backed up prior to the full or incremental backup operations. The backup management 112 and hypervisor 103 functions of system 100 may be implemented on a single server, such as server 102, or they may be distributed among two or more servers, such as in a system with a dedicated backup server and a separate dedicated VM monitor server. Embodiments of the single agent sharing system and method described herein apply equally to both network configurations, and other distributed server systems.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CMS (common internee file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

In an embodiment, hypervisor 103, which e implemented as a Hyper-V hypervisor, provides the guest operating systems of the VMs with a virtual operating platfoiin and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The vir ualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created.

In general, VM clusters 106 form the backbone of cloud computing architectures. As applications are launched in the system, the hypervisor 103 is provisioned to create VMs in accordance to the demand. Thus, as I/O operations increase, more VMs are spawned, and more data is generated that needs to be backed up. The backup operations must be synchronized among the VM clusters and the server(s). In a rapidly or greatly scaling system, this coordination and synchronization step becomes critical.

FIG. 1 is a diagram of a large-scale network implementing a single agent sharing manager 116 that a single point of configuration in the cloud network 100 for the backup management process 112. As stated in above, a common issue in present cloud backup methods is that a VM cluster with multiple VMs and multiple applications requires that backup agents must be installed on each VM. These agents must be updated or re-installed if new applications are spawned on the VM and this all requires that multiple backup operations need to be started and monitored in the backup application. Embodiments of the single agent sharing manager 116 overcome these issues by allowing the backup program managed by process 112 to be scalable and agile when numbers of VMs in the system increase. The backup configuration can respond dynamically to changes (e.g., addition, deletion, and modification of applications or application servers in the network. This allows several advantages, principally a faster configuration of the backup infrastructure as only a single application needs to be installed on the Hyper-V cluster and a single client needs to be configured on the backup server, and the setup is independent of the applications installed on the VM as the backup application has intelligence to detect supported applications on the agent and appropriate commands can thus be executed to freeze/thaw/snapshot on the application cluster VM.

Figure 2:
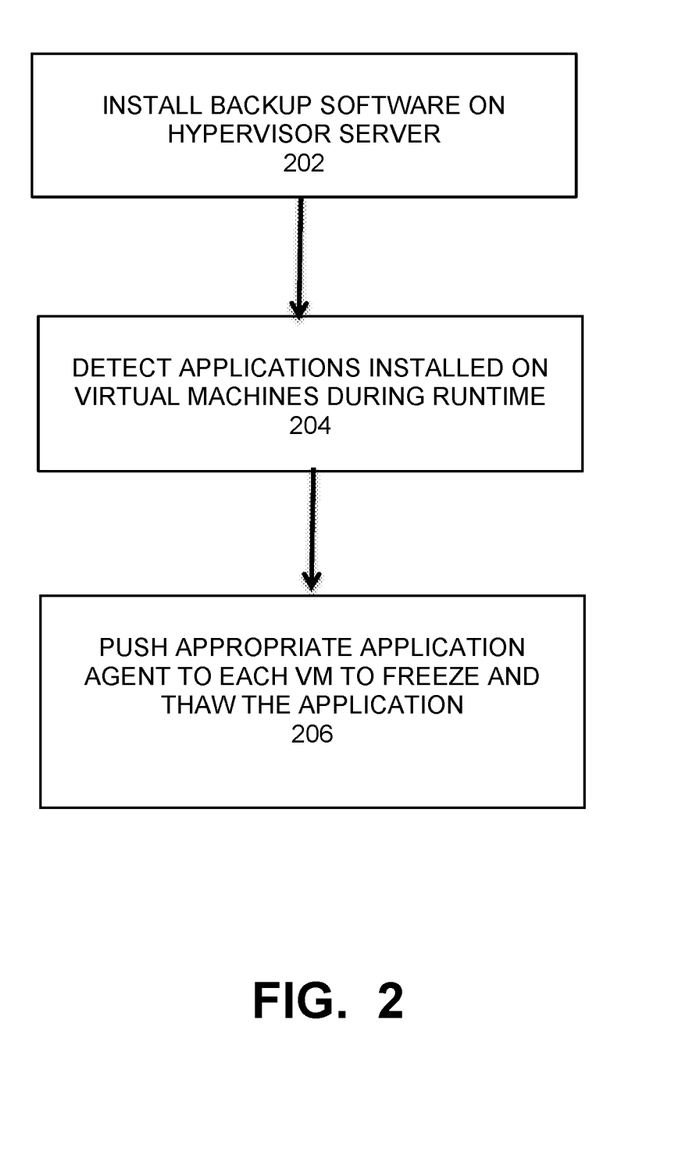
FIG. 2 is a flow diagram illustrating an overall process of implementing a backup process through a single agent sharing manager according to some embodiments.

In an embodiment, the overall network 100 implements a backup process 112 through the single agent sharing manager according to a process illustrated in the flow diagram of FIG. 2. As shown in FIG. 2, a data center computing environment will have a single instance of the backup software installed on the hypervisor server (Hyper-V cluster), block 202. The backup software will detect the application installed on the VM during runtime, block 204. Based on the detected application, the appropriate agent will be pushed onto the VMs to freeze and thaw the application, block 206. Under this embodiment, the clustered VM environment remains the same as in a standard aloud computing network, such as illustrated in FIG. 1. A single instance of the backup application is installed only on the Hyper-V server, and on the backup server side, only a single client will be created against the Hyper-V cluster name.

Figure 3:
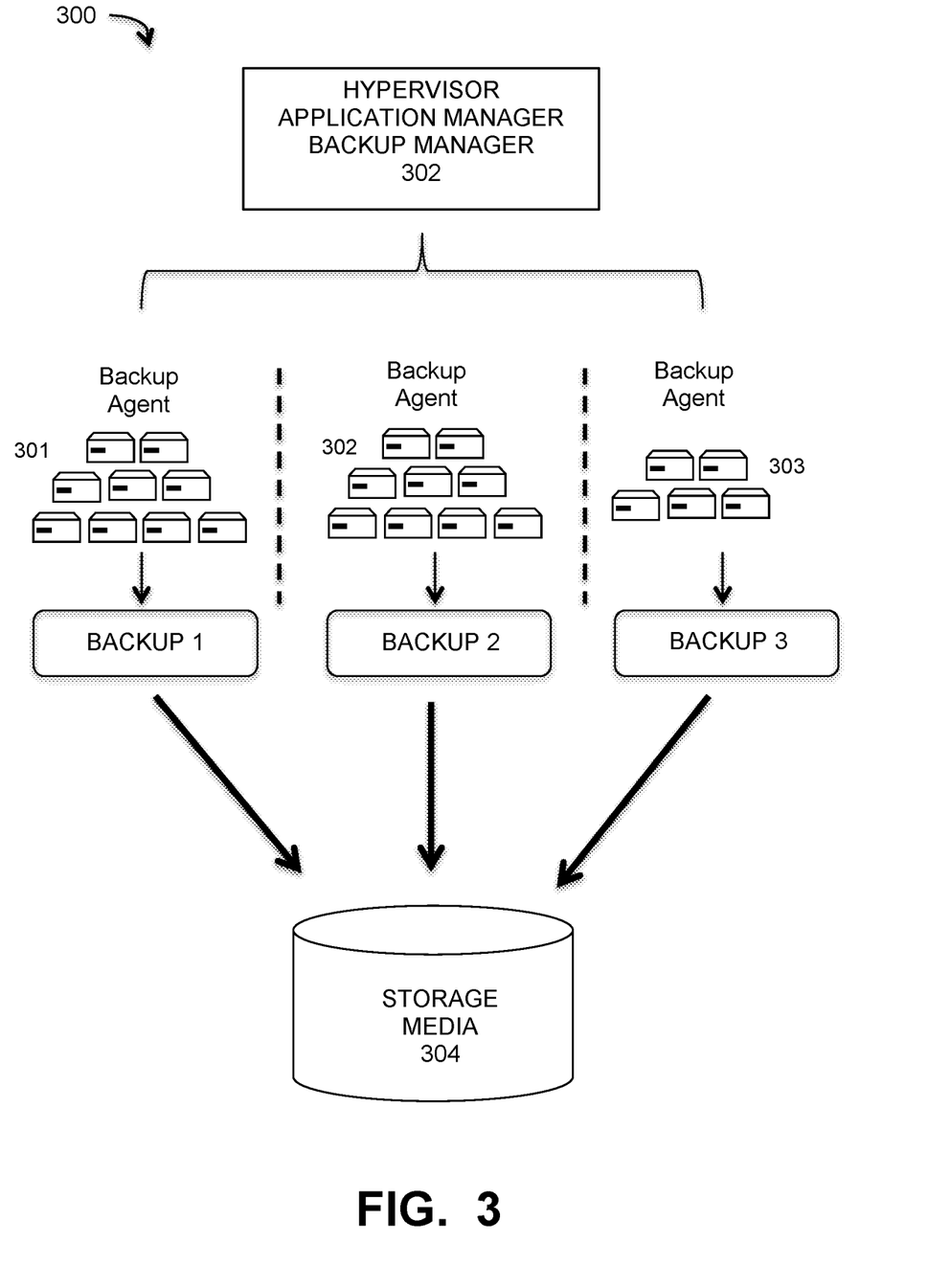
FIG. 3 is a diagram that illustrates a process of pushing backup agents onto VM clusters, under some embodiments.

FIG. 3 is a diagram that illustrates a process of pushing backup agents onto VM clusters, under some embodiments. As shown in diagram 300, a single manager entity 310, which may represent a composite or unitary hypervisor, application manager, and backup manager controls a number of data clusters 301, 302, and 303, such as those denoted cluster 1, cluster 2. The server 302 pushes a backup agent onto each cluster by creating a single client per cluster against the cluster name. As respective backup operations (denoted Backup 1, Backup 2, and Backup 3) are taken, the agents work to take snapshots and data backups in accordance to the deduplication backup processes of server 302 for storage on storage media 304.

Figure 4:
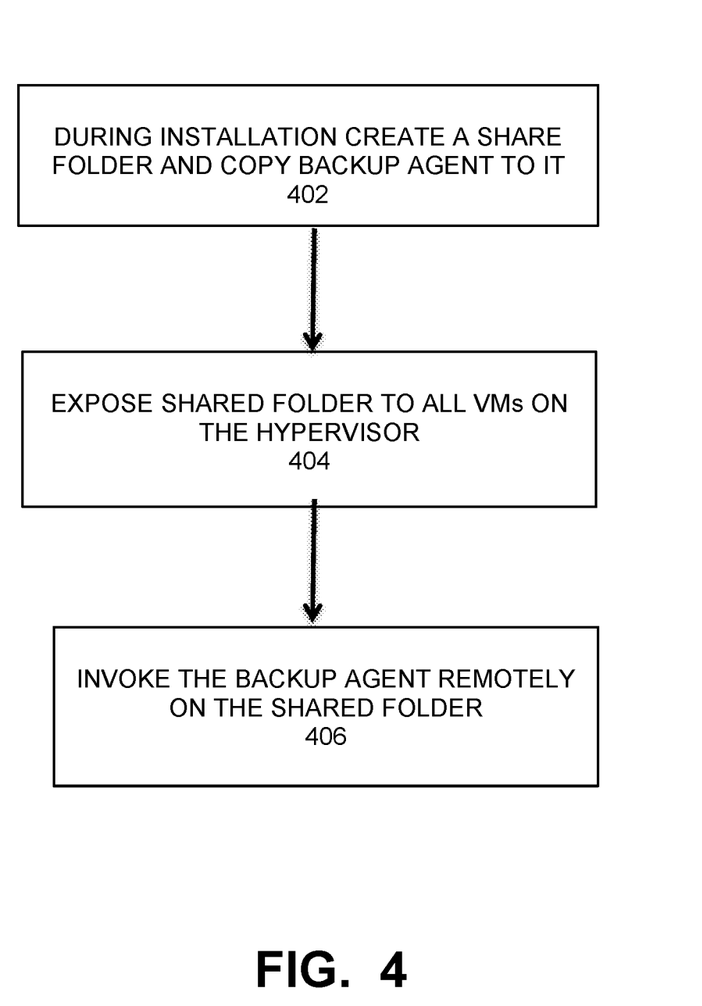
FIG. 4 is a flowchart that illustrates a method to execute a backup agent on the VMs hosted by the single agent server, under some embodiments.

FIG. 4 is a flowchart that illustrates a method to execute a backup agent on the VMs hosted by the single agent server, under some embodiments. As shown in FIG. 4, the process begins during product installation by creating a share folder, or other similar shared resource, and copying the backup agent to it, block 402. The shared folder (or other resource) can be created in any manner appropriate for the system. For example, for Hyper-V system, this is an MS-Windows shared folder, and for VMware systems it can be achieved using the "Shared Folder" feature. This shared folder is made be visible to all the VMs on the hypervisor, block 404. In Hyper-V this can be achieved by having the Hyper-V server and VMs in same domain, and in VMware systems, an application such as VMtools can be used to achieve this. The backup agent shared on this share folder then can be invoked remotely, block 406. The process invocation process can be executed in any manner appropriate to the system or platform. For example, for Hyper-V, the WMI process can be used. Following is an example code segment for using WMI for Hyper-V as follows:

strComputer="<Name/IPAdressOfVirtualMachine>"
Set objWMlService=GetObject("winmgmts:"_& "{impersonationLevel=impersonate}!\\" & strComputer & "\root\cimv2:Win32_Process")
Error=objWMlService.Create("<share location>\\backupagent.exe", null, null, intProcessID)
If Error=0 Then
Passed
Else
Failed
End If The following is an example code segment for using VMrun for VMware as follows:
"<Path to VMWare tools>\vmrun"-T server-h https://machine-name.domain-name:8333/sdk-u username-p password -gu<guestusername>-gp<guestpassword> runProgramInGuest "[standard] vmname/vmname.vmx"-activeWindow "<share location>\\ backupagent.exe"

To perform a backup operation, process 112 invokes single backup agent to the VMs that are being backed up. This agent then detects applications present on the machine, and will start the backup process by involving all the applications present on it. If the application is clustered, the application job of backup synchronization between participating nodes will be taken care of by this backup agent.

In an embodiment, an overall process of a backup operation proceeds as follows: (1) the backup operation starts on the Hyper-V Server; (2) the backup process pushes a backup agent binary inside each VM; (3) the backup process on the Hyper-V server contacts the backup agents pushed inside the VM to take the applications into a consistent state (4) the backup process takes a snapshot of the VMs; and (5) the backup process copies the data to the backup media. In general, a consistent state means flushing all of the VM memory and I/O operations so that the application is completely consistent. In doing so, there is nothing in memory and no pending I/O cycles to be lost. A proper application consistent state is the same state that would exist if the application were properly closed.

In an embodiment, the snapshot comprises a point-in-time, read-only backup of the application and associated data in one or more files or volumes on one or more virtual machines. The backup operation itself may be one of a full system backup, a differential backup, or an incremental backup.

Figure 5:
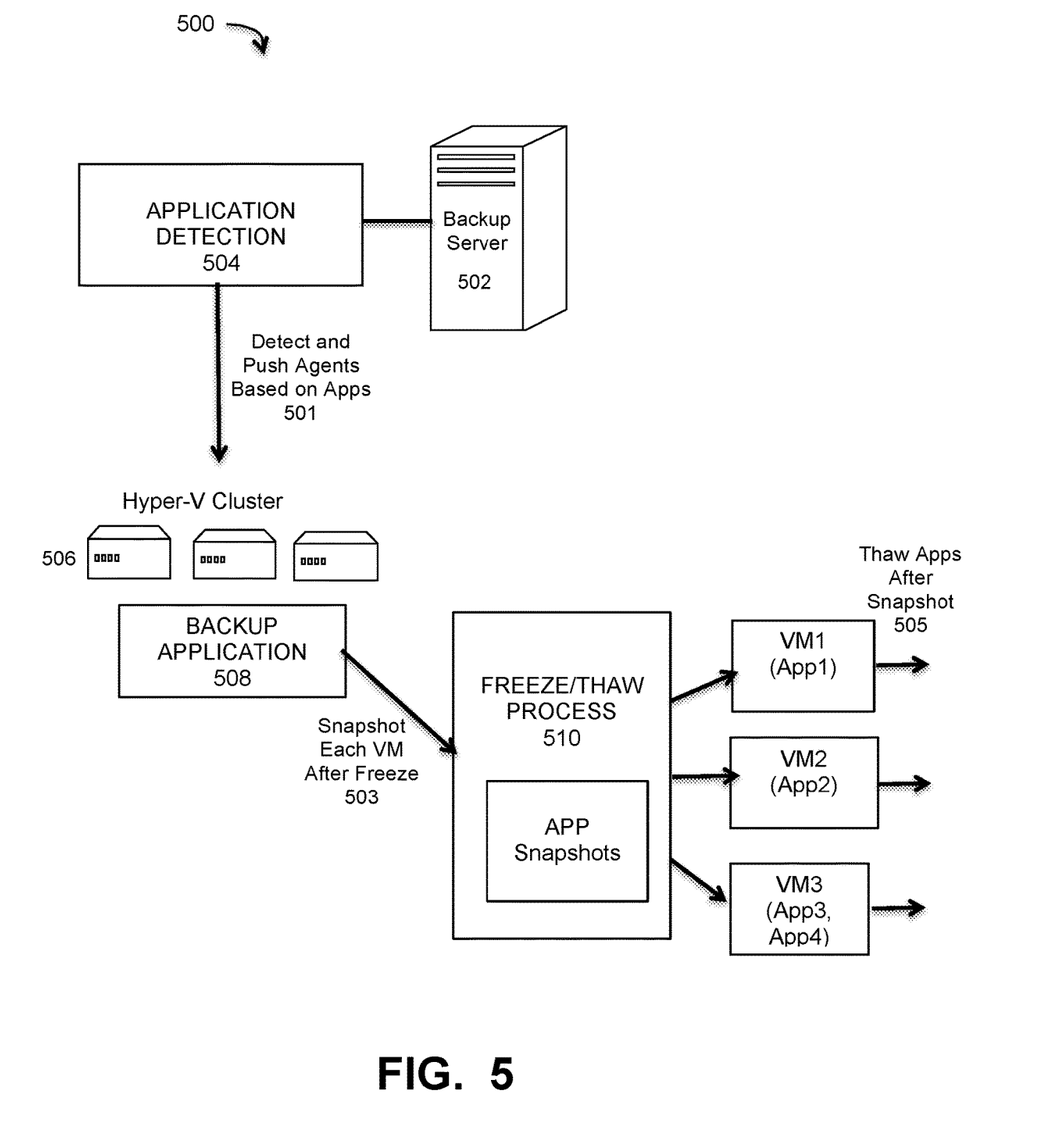
FIG. 5 is a diagram illustrating a backup infrastructure implementing a single backup agent process, under some embodiments.

FIG. 5 is a diagram illustrating a backup infrastructure implementing a single backup agent process, under some embodiments. As stated above, this infrastructure requires the installation of backup software only on the Hyper-V cluster. As shown in diagram 500, backup server 502 runs a backup software program that includes a detection process detects the application or applications installed on the VMs 506 in a cluster during runtime. Based on the detected applications an appropriate agent is pushed on the VMs, step 501. The agent causes the I/O operations to the application to be intercepted and buffered according to appropriate Freeze and Thaw routines. In a Freeze operation, incoming I/Os are received but stored in a temporary memory and not executed during the backup operation, and in a Thaw operation, I/O operations are received and executed after a backup operation. The detection process of installed applications on the virtual machines is an automated that can be performed using a registry key, or other relevant methods depending on the applications being targeted.

The system can be configured to backup all applications detected by process 504. Optionally, if a user does not want to backup all the applications present on the machine but instead wants to backup only some specified applications, this preference can be invoked by an appropriate configuration command. For example, it can be specified as part of saveset, e.g., hypervcluster:VM name<:application 1 name><:application 2 name>. In this case, a single backup agent will then be pushed to the VM with this information, and only the specified application will be involved in backup process.

During the backup operation the backup application 508, through the pushed agents, takes a snapshot of each VM in the cluster after a Freeze operation, step 503. In the example embodiment of FIG. 5, three VMs 506 each have corresponding applications such as App1 for VM1, App2 for VM2, and App3 and App4 for VM3. After a Freeze operation in which I/Os to the Apps are buffered, the backup process takes a snapshot backup of VM1(App1), VM2 (App2) and VM3(App3,App4) at a particular point in time, by the freeze/Thaw process 510 of the backup program. After the snapshots are taken, the Thaw process allows I/Os to continue to the applications, step 505.

Figure 6:
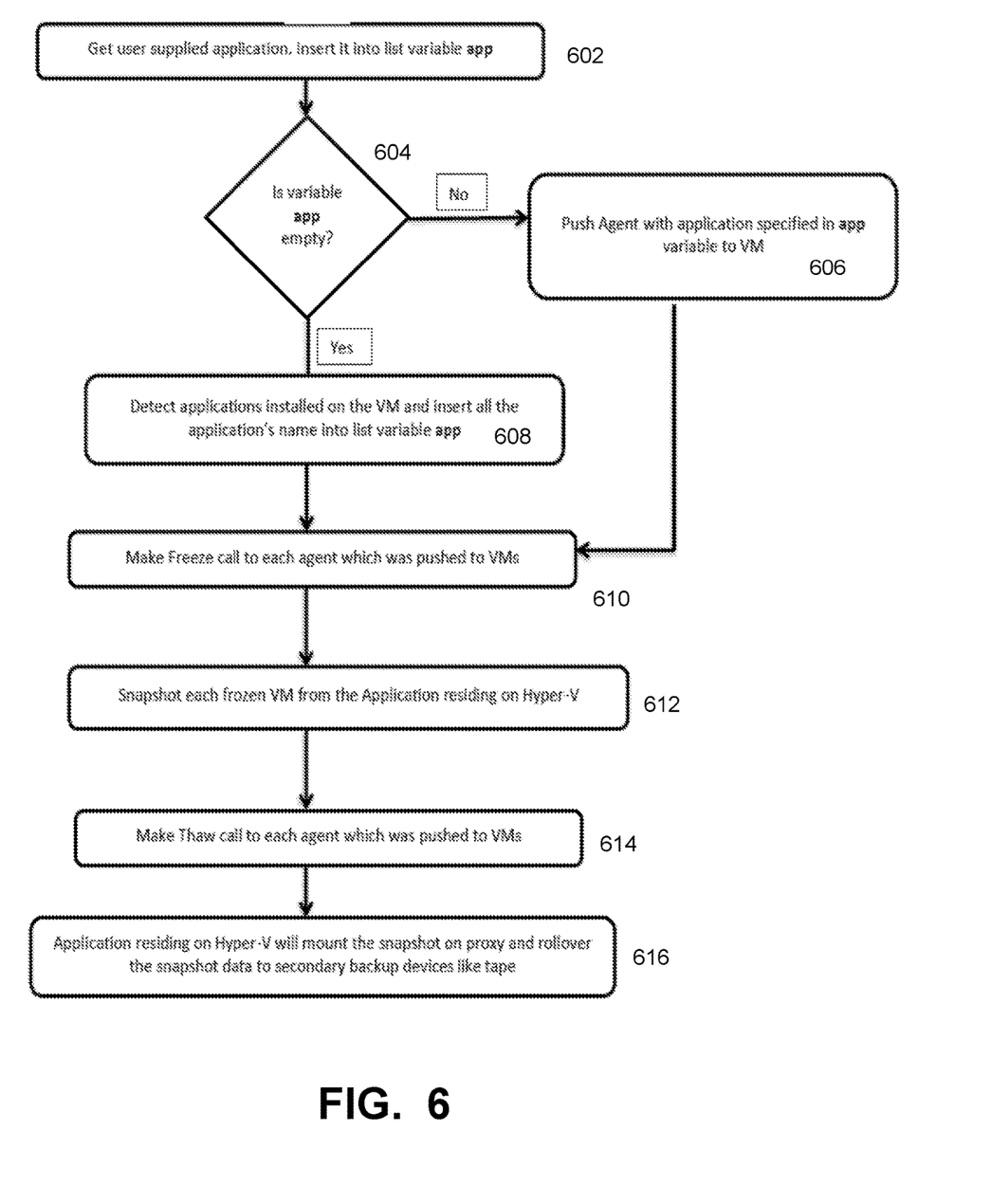
FIG. 6 is a flowchart that illustrates a method of performing a backup using a single backup agent process, under some embodiments.

FIG. 6 is a flowchart that illustrates a method of performing a backup using a single backup agent process, under some embodiments. The process of FIG. 6 starts with the detection of applications by the backup process. Applications can be user supplied or automatically (or intelligently) detected using by using a registry key (as in MS-Windows or Linux) or similar mechanism. In step 602 any user supplied applications are inserted into a list variable (variable app), step 602. In decision step 604 it is determined whether or not the variable app list is empty. If is empty, the backup process detects the applications installed on the VM and inserts the variable names into the list variable app, step 608. If, in step 604, the variable app is not empty, the backup application pushes the agent with the application specified in the variable app to the VM.

In an embodiment, detection of installed applications on the virtual machines is an automated detection process. This process can be performed using a registry key, or any similar method. In an embodiment, processing logic for an application to detect a virtual machine uses an agent to read the windows registry to detect an application. If the registry read returns a successful result, it is determined that application is installed on the virtual machine. For example, to detect whether or not a SQL server is installed, the agent will read the following registry en in'.
HKLM\\SOFTWARE\\Microsoft\\Microsoft SQL Server\\Instance Names\\SQL and HKLM\\SOFTWARE\\Wow6432Node\\Microsoft\\Microsoft SQL Server\\Instance Names\\SQL.

Once the detected or user supplied apps are in the list variable app, and the backup agent has been pushed to the VM, a backup process may be performed. For this the process makes a Freeze call to each agent that was pushed to the VMs, step 610. It then takes a snapshot of each frozen VM from the application residing on the hypervisor, step 612. After the snapshot, it makes a Thaw call to each agent that was pushed to the VMs, step 614. The application residing on the hypervisor will mount the snapshot on proxy, and rollover the snapshot data to a secondary backup device, like a tape drive, step 616.

The process of FIG. 6 may be implemented in any appropriate software routine depending on the host operating system and network configuration. Example programming code to implement at least parts of the process of FIG. 6 is provided for the sake of description as follows:
String[ ] backupApplication;
bool success=false;
backupApplication=getBackupApplicationFromSaveSet ( );
if (backupApplication !=NULL) {
//Backup applications were detected in the saveset, go ahead and push agents to VMs
success=pushApplicationAgentToVM(backupApplication);
} else {
//Backup applications were not detected in the saveset
//Detect all the applications installed on the VM
backupApplication=getBackupApplicationFromVM( )
//Push agents for all the applications detected on the VM
success=pushApplicationAgentToVM(backupApplication);
}
if (success) {
//continue the backup
//freeze
//snapshot
//thaw
//mount
//rollover
. . .
} else {
//Fail with error saying Agent could not be pushed. Check the VM
}

The above code segment, and any others shown herein are provided for the sake of illustration only, and do not limit any embodiments or implementations. Many alternative languages, data elements, and code structures as known to those of skill in the art may be used to achieve the same functionality, Embodiments of the single point configuration for VMs in a cloud environment as described herein allows several advantages including, but not limited to: (1) faster configuration of the backup infrastructure as single application needs to be installed on the Hyper-V cluster and a single client needs to be configured on the backup server, thus simplifying the administrator's job; (2) the setup is independent of the applications installed on the VM as the backup application has intelligence to detect supported applications on the agent and appropriate commands can thus be executed to freeze/thaw/snapshot on the application cluster VM; (3) improvement in TCE (Total Customer Experience) by making the configuration simpler and easier, as the entities that are required to be configured are minimized; (4) simplifying debugging with single point logging, as logs will be present on the Hyper-V cluster instead of being distributed across all the VMs involved in the backup; and (5) simplified monitoring of the backup as only a single client will have to be configured and monitored.

Although embodiments are directed to a Hyper-V hypervisor that creates virtual machines on certain computer systems, such as x86-64 Windows-based systems, embodiments are not so limited. Any appropriate virtual machine network based on any practical host and VMM platform may be used. In an embodiment, one or more other backup agents or processes may be used to execute certain backup processes. One example, is the "NMM" (Networker Module for Microsoft) module that initiates and executes one or more backup tasks and sessions, such as full or incremental backups of the volumes and files of the VMs. Upon initiation of a backup operation, this backup agent sends a VM export request to a VMM service and VM data is exported through the appropriate file system (e.g., VM/VHDx files and/or configuration/state files) for storage on appropriate storage media (e.g., RAID disks). The VM file and volume data may be associated with metadata, and the backup metadata can be stored directly on a server computer, such as an EMC Networker server.

Although embodiments have been described with respect to backup comprising certain specific technologies, such as Hyper-V servers, backup agents, and VM (e.g., CSV clusters), it should be noted that embodiments are not so limited, and that other backup systems and methods may also utilize the VM single agent sharing manager methods described herein. In an embodiment, virtual machines are distributed onto a disk that is visible to an entire hypervisor cluster setup in such a way that the disk is always write accessible by only one node in the cluster but read accessible to all nodes in the cluster at one point in time. One example of such a disk is a Cluster shared volumes (CSV) system comprising a cluster disk containing file system volumes for the virtual machines.

Figure 7:
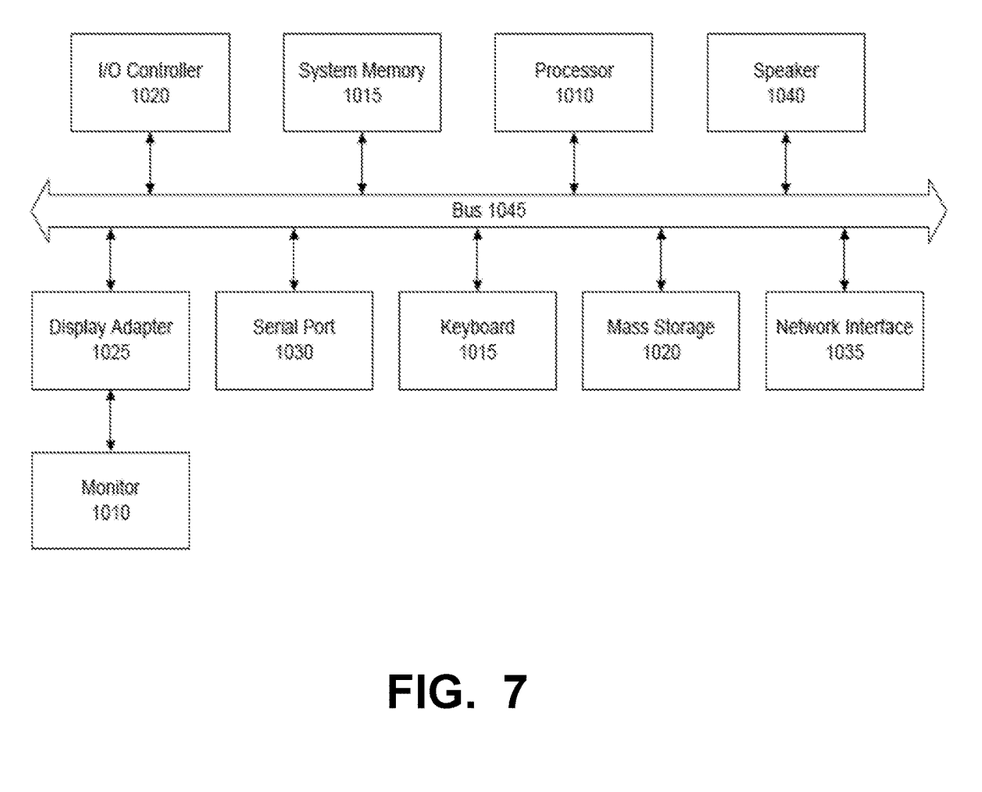
FIG. 7 shows a system block diagram of a computer system used to execute the software of the present system described herein.

The cloud computing environment of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1010, keyboard 1015, and mass storage devices 1020. Computer system 1005 further includes subsystems such as central processor 1010, system memory 1015, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up virtual machines in a clustered network of multiple virtual machines per cluster all coupled to a backup server in a large-scale data storage system, comprising:
   installing a single agent sharing manager in a backup management program on the backup server;
   creating a shared folder to hold backup agents for the multiple virtual machines;
   pushing, by the single agent sharing manager and from the shared folder, a respective backup agent to each virtual machine by creating a single client per cluster against a respective cluster name;
   detecting, through the backup agent, all applications running on a respective virtual machine;
   taking a snapshot of each application after freezing the applications and prior to thawing the applications, by the backup agent;
   saving the snapshot of the each application on a storage medium; and
   updating a respective backup agent for a changed application on a virtual machine in the shared folder by the single agent sharing manager.

2. The method of claim 1 wherein the detection of installed applications on the virtual machines is an automated detection process that is performed using a registry key.

3. The method of claim 1 wherein the snapshot comprises a point-in-time, read-only backup of the application and associated data in one or more files or volumes on one or more virtual machines, and wherein the backup operation comprises one of a full system backup or an incremental backup.

4. The method of claim 3 wherein the freezing comprises a freeze operation that stores input/output operations to the applications in a temporary memory location and stops them being executed by the applications prior to the snapshot, and the thaw operation allows the input/output operations to be received and executed by the applications after the snapshot.

5. The method of claim 3 wherein the virtual machines are distributed onto a disk that is visible to an entire hypervisor cluster setup in such a way that the disk is always write accessible by only one node in the cluster but read accessible to all nodes in the cluster at one point in time, and wherein one example of such a disk is a Cluster shared volumes (CSV) system comprising a cluster disk containing file system volumes for the virtual machines.

6. The method of claim 5 wherein the backup server comprises a hypervisor monitoring and managing the virtual machines, and wherein the hypervisor comprises a Hyper-V platform or ESXi platform.

7. The method of claim 6, wherein the pushing comprises:
   exposing the shared folder to all the virtual machines on the hypervisor for remote invocation by the backup program.

8. A system comprising:
   a server computer executing a backup program and a hypervisor for managing virtual machines; and
   a plurality of clusters of virtual machines functionally coupled to the server computer over a cloud-based network, wherein, upon initiation of a backup process, the server computer installs a single agent sharing manager in the backup program and creates a shared folder to hold backup agents for the virtual machines, wherein the single agent sharing manager pushes a respective backup agent from the shared volume to each virtual machine of the cluster by creating a single client per cluster against a respective cluster name, and invokes each backup agent to collectively put all applications executed by the virtual machines in a consistent state, and further wherein the backup process takes a snapshot of the virtual machines and each application running on each respective virtual machine and stores each snapshot on storage media, and further wherein a respective backup agent for a changed application on a virtual machine is updated in the shared folder by the single agent sharing manager.

9. The system of claim 8 wherein the consistent state comprises flushing all of memory and I/O operations of the cluster so that the application of each respective virtual machine is completely consistent so that nothing is stored in memory and no pending I/O cycles will be lost.

10. The system of claim 9 wherein the backup program detects, through the backup agent, all applications running on each respective virtual machine, and takes the snapshot of each application after freezing the applications and prior to thawing the applications.

11. The system of claim 10, wherein the backup server exposes the shared folder to all the virtual machines on the hypervisor for remote invocation by the backup program.

12. The system of claim 9 wherein the snapshot comprises a point-in-time, read-only backup of the application and associated data in one or more files or volumes on one or more virtual machines, and wherein the backup operation comprises one of a full system backup or an incremental backup.

13. The system of claim 8 wherein the backup server executes a freeze operation that buffers input/output operations to the applications and stops them being executed by the applications prior to the snapshot, and a thaw operation that allows the input/output operations to be received and executed by the applications after the snapshot.

14. The system of claim 9 wherein the virtual machines are organized into cluster shared volumes (CSV) comprising a cluster disk containing file system volumes for the virtual machines.

15. The system of claim 14 wherein the backup server comprises a Hypervisor platform.

16. A computer program product, comprising a non-transitory computer-readable medium having a computer-readable program code embodied therein, the computer-readable program code adapted to be executed by one or more processors to implement a method for backing up virtual machines coupled to a backup server in a large-scale data storage system, by:
   installing a single agent sharing manager in a backup management program on the backup server;
   creating a shared folder to hold backup agents for the multiple virtual machines;
   pushing, by the single agent sharing manager and from the shared folder, a respective backup agent to each virtual machine by creating a single client per cluster against a respective cluster name;
   detecting, through the backup agent, all applications running on a respective virtual machine;
   taking a snapshot of each application after freezing the applications and prior to thawing the applications, by the backup agent;
   saving the snapshot of the each application on a storage medium; and updating a respective backup agent for a changed application on a virtual machine in the shared folder by the single agent sharing manager.

17. The computer program product of claim 16 further comprising computer-readable program code to implement the method further comprising:

exposing the shared folder to all the virtual machines on a hypervisor for remote invocation by the backup program.

\* \* \* \* \*